United States Patent Office 3,426,094
Patented Feb. 4, 1969

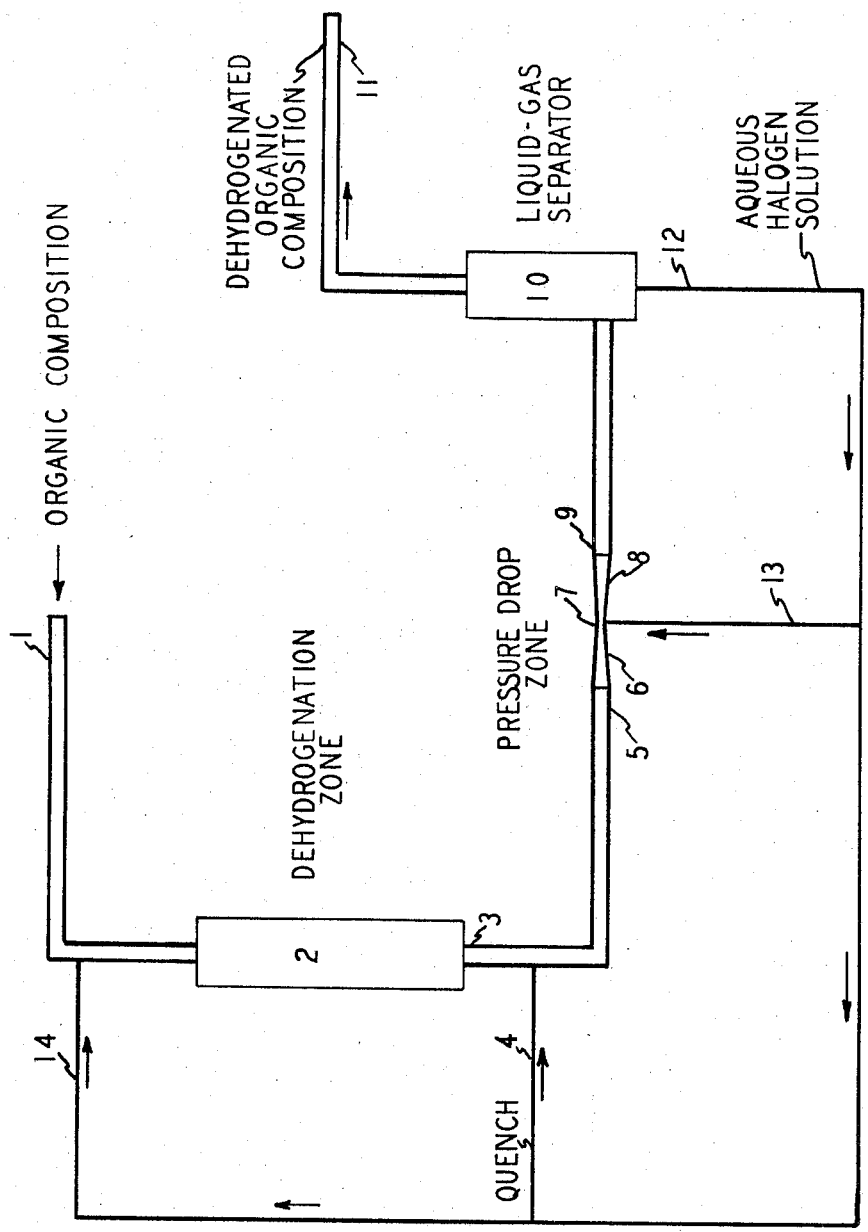

3,426,094
PREPARATION OF UNSATURATED COMPOUNDS
Olin C. Karkalits, Jr., Houston, Tex., assignor to Petro-Tex Chemical Corporation, Houston, Tex., a corporation of Delaware
Filed Mar. 5, 1963, Ser. No. 262,902
U.S. Cl. 260—680        12 Claims
Int. Cl. C07c 11/22, 7/00

This invention relates to a process for the purification of unsaturated organic compounds which are contaminated with inorganic halogen. More particularly, one feature of this invention relates to an improved method for the dehydrogenation of organic compounds with halogen catalysts.

The use of halogen as a catalyst for the dehydrogenation of organic compounds has been disclosed in copending applications. According to those applications, unsaturated organic compounds may be produced by reacting at elevated temperatures a mixture of the organic compound to be dehydrogenated, oxygen and a source of halogen. The effluent from the dehydrogenation zone comprises the unsaturated product, generally some unconverted feed and halogen in the form of elemental halogen and/or halogen compounds. The halogen is an expensive ingredient in the process and should be recovered from the effluent. In addition to the consideration of the cost of the halogen, the halogen should be recovered from the unsaturaated product because of the deleterious effect of the halogen on some of the end uses of the unsaturated product.

Some of the halogen may be removed from the gaseous effluent from the dehydrogenation zone by contacting the effluent with an aqueous spray as the effluent leaves the reactor, followed by separation of the liquid and gaseous phases. However, the desired high percentage recovery of halogen, such as greater than 90 percent, are not readily obtained by such simple procedures.

It is an object of this invention to provide a process for the removal of inorganic halogen from a gaseous stream containing unsaturated organic compounds. It is an object of this invention to provide a process for the recovery of the inorganic halogen from the gases leaving the dehydrogenation zone of a dehydrogenation process utilizing a halogen containing material as a catalyst. It is further an object of this invention to provide an improved process for the dehydrogenation of organic compounds to more unsaturated organic compounds utilizing halogen catalysts. Another object of this invention is to devise a process for the recovery and reuse of the halogen in the form of hydrogen halide in dehydrogenation processes utilizing hydrogen halide as a catalyst. Another object of this invention is to devise a process for the recovery and reuse of the halogen in the form of ammonium halide in dehydrogenation processes utilizing ammonium halide as a catalyst. Still another object of this invention is to provide a process for the recovery of halogen from unsaturated organic compounds with a minimum amount of polymer or tars formation. Other objects of this invention will be evident from the discussion and claims which follow.

The above objects may be accomplished according to the process of this invention. Broadly speaking, the process of this invention comprises contacting under particular conditions a gaseous composition comprising unsaturated organic compounds and inorganic halogen at an elevated temperature with an aqueous quench, followed by passing the resulting compositions through a pressure drop zone which comprises a restricted area wherein the gases are subjected to a pressure drop and the gases are at the same time contacted with a liquid solvent for the inorganic halogen. Thereafter, the stream is separated into a gas phase which is the purified unsaturated organic compound and a liquid phase which contains the inorganic halogen.

One source of a composition to be separated according to this invention is the effluent from certain dehydrogenation processes. Processes for dehydrogenation utilizing halogen and oxygen are described in copending applications. According to these processes, the compound to be dehydrogenated together with oxygen and halogen as a catalyst is reacted at elevated temperatures to form a reaction mixture comprising any unreacted feed, the unsaturated product and various halogen compounds.

The source of halogen fed to the dehydrogenation zone may be either elemental halogen or any compound of halogen which would liberaate halogen under the conditions of reaction. Suitable sources of halogen are such as hydrogen iodide, hydrogen bromide and hydrogen chloride; aliphatic halides such as ethyl iodide, methyl bromide, 1,2-dibromo ethane, ethyl bromide, amyl bromide and allyl bromide; cycloaliphatic halides such as cyclohexylbromide; aromatic halides such as benzyl bromide; halohydrins such as ethylene bromohydrin; halogen substituted aliphatic acids such as bromoacetic acid; ammonium iodide; ammonium bromide; ammonium chloride; organic amine halide salts such as methyl amine hydrobromide; and the like. Mixtures of various sources of halogen may be used. The preferred sources of halogen are hydrogen bromide, hydrogen iodide, hydrogen chloride, ammonium bromide, ammonium iodide, ammonium chloride, alkyl halides of one to six carbon atoms and mixtures thereof, with the iodine and bromine compounds being particularly preferred. When terms such as halogen liberating materials of halogen materials are used in the specification and clims, this includes any source of halogen such as elemental halogens, hydrogen halides or ammonium halides. The amount of halogen, calculated as elemental halogen, may be as little as about 0.001 or less mol of halogen per mol of organic compound to be dehydrogenated, although larger amounts such as 0.2 or 0.5 mol my be used. The preferred range is from 0.001 to 0.09 mol of halogen.

The oxygen may be supplied by any source such as pure oxygen or as air. The amount of oxygen will normally be in the range of about 0.25 mol of oxygen to 1.5 or 2.5 mols of oxygen per mol of hydrocarbon to be dehydrogenated. As high as 5 mols of oxygen and higher have been employed. In relation to halogen, the amount of oxygen employed will usually be greater than 1.25 mols of oxygen per atom of halogen and normally will be greater than 1.5 mols of oxygen per atom of halogen. Usually the ratio of mols of oxygen to atoms of halogen will be from about 2 to 150 with the best results having been obtained at ratios between about 8 to 100 mols of oxygen per atom of halogen. Diluents such as stream, nitrogen, carbon dioxide or hydrocarbons may be included to reduce the partial pressure of the compound to be dehydrogenated to less than equivalent to about 10 or 15 inches of mercury absolute at a total pressure of one atmosphere. Desirable results have been obtained utilizing from about 3 to about 30 mols of steam per mol of compound to be dehydrogenated, and excellent results have been achieved with from about 5 to 15 or 20 mols of steam per mole of compound to be dehydrogenated.

These processes may be conducted in the absence of contact catalysts, but better results are obtained if the reaction is conducted in the presence of catalysts containing metal atoms of Groups I–A, I–B, II–A, II–B, III–A, III–B, IV–A, IV–B, V–A, V–B, VI–B, V–IIIB, VIII, the lanthanum series elements, thorium, uranium, and mixtures thereof. The preferred catalysts are compounds of elements of Groups I–A, I–B, II–A, IV–B, V–B, VI–B, VII–B, V–III, and the lanthanum series elements and mixtures thereof. These groups are based on the Periodic Table as found in the Handbook of Chemistry and Physics, 39th (1957–58) Edition, Chemical Rubber Publishing Co. These metal atoms may conveniently be present in the forms of the elemental metal; metal oxides; metal hydroxides; metal salts such as the iodides, bromides and chlorides; or as metal compounds which will be converted to these forms under the conditions of reaction. Examples of catalysts would be potassium oxide, magnesium oxide, lanthanum oxide, titanium dioxide, vanadium pentoxide, chromous oxide, manganese dioxide, ferric oxide, cobaltic chloride, nickel phosphate, cuprous phosphate, zinc phosphate, gallium sesquioxide, stannic phosphate and bismuth trioxide.

These processes will normally be conducted at a temperature of reaction between about 400° C. to about 850° C. or higher, such as about 1000° C. The temperature of reaction is measured at the maximum temperature in the reactor. The flow rates of the reactants may be varied quite widely and can be established by those skilled in the art. Good results have been obtained with flow rates of the compound to be dehydrogenated ranging from about ¼ to 25 liquid volumes of compound to be dehydrogenated per volume of reaction zone per hour, with the volumes of liquid calculated at standard conditions of 15.6° C. and 760 mm. of mercury absolute. The reaction zone is defined as the portion of the reactor which is at a temperature of at least 400° C. The residence or contact time of the reactants in the reaction zone under any given set of reaction conditions depends on all the factors involved in the reaction. Contact times such as from about 0.001 to about 5 or 10 seconds have been found to give excellent results. Generally the contact time will be between about 0.01 and one second. Contact time is the calculated dwell time of the reaction mixture in the reaction zone assuming the mols of product mixture are equivalent to the mols of feed.

The preferred compounds to be dehydrogenated are aliphatic hydrocarbons of 2 to 6 carbon atoms, which contain at least two adjacent carbon atoms, each of which carbon atoms has at least one hydrogen atom attached. The dehydrogenation will produce compounds having double and/or triple bonds in aliphatic chains. Thus, butadiene-1,3 and/or vinylacetylene may be produced from butene-1 or butene-2 or mixtures thereof, and isoprene may be produced from any of the methyl butenes, such as 2 - methyl butene - 1, 2 - methyl butene - 2 or 2 - methyl butene - 3 or mixtures thereof. Isoprene may also be produced from methyl butanes, such as 2-methyl butane also olefins and diolefins may be produced from saturated hydrocarbons, for example, vinyl acetylene, butadiene and butene may be produced from n-butane. A mixture of monoolefins and diolefins may also be produced, such as a mixture of butadiene-1,3 and butenes from a feedstock of a mixture of n-butane and butene. Good results have been obtained with a feed containing at least 50, such as at least 75, mol percent of a monoethylenically unsaturated aliphatic hydrocarbon, such as the hydrocarbons of 4 to 5 carbon atoms having a straight chain of at least four carbon atoms and a single double bond.

According to this invention, the gaseous mixture leaving the dehydrogenation zone is first cooled by quenching the effluent gases with a spray of an aqueous composition. The quenched gaseous mixture is then conducted to the pressure drop zone. The pressure drop zone comprises a duct or conduit through which the gases pass. The inlet section of the pressure drop zone is a contraction area wherein the conduit becomes smaller in cross-sectional area. The gases are forced through this contraction area to the point of greatest restriction in the conduit, which is the throat of the pressure drop zone. By forcing the gases through the more restricted portion of the pressure drop zone, the velocity of the gases is accelerated. While the gases are at an accelerated velocity, they are contacted with the contacting liquid. The contacted gases are then allowed to expand and decelerate by passing through an expansion section which is a section of the conduit which is of increased cross sectional area. It is essential that there be a certain amount of energy expended in the pressure drop zone. This energy loss may be measured by the pressure drop across the pressure drop zone. The expanded gases will then contain a liquid aqueous phase which contains the removed halogen. This liquid phase may be separated from the gaseous phase by a liquid-gas separator.

A typical application of one of the preferred processes of this invention is illustrated in the drawing. The organic composition to be dehydrogenated is introduced by 1 into the dehydrogenation zone 2 together with the halogen catalyst 14. The effluent 3 from the dehydrogenation zone 2 is quenched by a portion of the aqueous halogen solution 4. The gases continue to the pressure drop zone where they are first forced through the tapered section 6 to the area of maximum restriction at the throat 7. The gases in the restricted area 7 are contacted with the aqueous liquid 13 which is a portion of the recovered aqueous halogen solution. The contacted gases are then allowed to expand through the tapered section 8. The pressure drop across the pressure drop zone is measured immediately before and after the pressure drop zone at points 5 and 9. The contacted gases are then separated in a liquid-gas separator 10. The overhead gases 11 may then be further purified or processed as desired. The liquid bottoms 12 comprising an aqueous solution of halogen may be used as desired such as the contacting liquid 13 fed to the pressure drop zone, as the quench liquid 4 and as the catalyst feed 14 to the stream entering the dehydrogenation zone.

The initial quench of the hot gases leaving the dehydrogenation zone containing halogen may be made with any composition which is a solvent for the organic halogen contained in the gases. An aqueous quench composition may be either liquid or gaseous, or a combination of liquid and gaseous. Compositions such as water or aqueous solutions of halogen such as elemental halogen, halogen halides, or ammonium halides are particularly suitable, with the solutions of halogen being preferred. The quench composition may contain from 0 to about 60 weight percent of total inorganic halogen in all forms such as in the form of elemental halogen, halogen halide or ammonium halide. Preferably the quench composition will contain from about .01 to 50 weight percent inorganic halogen based on the total weight of quench composition. The phrase inorganic halogen refers to water soluble halogen atoms present other than in organic compounds, such as elemental halogens, hydrogen halides and ammonium halides. The preferred quench solutions will contain the same halogen as being fed to the dehydrogenation zone as catalyst. For example, if ammonium iodide is the dehydrogenation catalyst, the quench solution might comprise an aqueous solution of ammonium iodide. The temperature of the effluent from the dehydrogenation zone will be at least 400° C. The quenching operation will normally cool the effluent gases to a temperature of about 60° C. to 300° C., although the temperature may be somewhat higher or lower. The temperature of the quench liquid is not critical so long as it is liquid and at a temperature sufficiently low to cool the effluent gases to the desired temperature. Aqueous quench compositions of temperatures from about 10° C. to 120° C. may be suitably employed. The amount of quench composition used will be dependent upon such variables as the temperature of the effluent gases, the specific heat of the gases, the temperature of the quench liquid, and so forth. The quench composition may be fed at a rate of from about ½ to 30 mols of water contained in the quench composition per mol of total organic gases leaving the reactor, and usually will be within the range of about 3 to 10 mols of water per mol of total organic gases leaving the reactor. The reactor effluent may be contacted by the quench composition either at one point or at a plurality of points. For example, either a single or multiple set of quench sprays have been advantageously used.

The quenched gases may then be conducted to the pressure drop zone. The temperature of the gases entering the pressure drop zone will generally be within the range of about 60 or 80° C. to 500° C., and preferably will be no greater than about 250° C. The pressure drop across the pressure drop zone will be at least 15 inches of water, although higher pressure drops such as at least 25 inches of water have given better results. Excellent results have been obtained at pressure drops between about 40 and 120 inches of water. The upper limit of the pressure drop will be determined by practical considerations including the amount of energy loss that can be tolerated in the system. Conveniently the pressure drop will be no greater than about 100 inches of water. The amount of pressure drop across the pressure drop zone can be increased by increasing the velocity of the gases entering the pressure drop zone and/or increasing the rate of introduction of the contacting liquid to the restricted area. Of course, the pressure drop will also be dependent upon the design of the pressure drop zone and will especially be dependent upon the cross sectional area of the most restricted area, or throat. There will always be an acceleration in the velocity of the gases as they pass through the inlet or contraction area of the pressure drop zone and the velocity will be at a maximum at the throat, which is the most restricted area. The velocity of the gases at the point of maximum velocity may be varied to suit the demands of the process. Typically gas velocities at the throat will be between 100 to 800 feet per second, with the range more often being between about 250 and 600 feet per second. The velocity of the gases decreases as the gases pass through the expansion area of the pressure drop zone.

It has been found that the efficiency of the halogen removal depends primarily upon the pressure drop across the pressure drop zone. As pointed out above, one method of regulating the pressure drop is by regulation of the rate of flow of the aqueous contacting liquid to the pressure drop zone. With other conditions remaining constant, the pressure drop will be greater with larger flows of aqueous contacting liquid. The flow rate of the aqueous contacting liquid will be varied relative to the other variables affecting the pressure drop. Flow rates of about 2 to 20 mols of water per total mols of organic gases passing through the pressure drop zone have resulted in efficient operation of the invention.

The essential features of the pressure drop zone are that it be a zone that has an inlet section which is a contraction zone for the gases attached to a restricted zone which in turn is attached to an expansion zone. There must also be provision for entry of the aqueous contacting liquid to the apparatus. The contraction section may be connected directly to the expansion section and in this instance the point of maximum restriction, or throat, is simply the point at which the cross sectional area ceases to decrease and begins to increase. Another possibility is for the contraction area to be connected to a throat which is of a constant cross sectional area and is of some finite length; the throat can then be connected to the expansion area. This latter arrangement is desirable in that the throat area is sufficiently long for easy introduction of the aqueous contacting liquid. An entirely satisfactory design of a pressure drop zone is a device wherein the internal surface of the contraction area is a truncated cone which is connected at the small end to the small end of a second truncated cone, which second cone is the expansion area. As suggested above, the small ends of the cones may be connected by a relatively short cylinder, preferably of the same diameter as the small ends of the truncated cones. The larger ends of the cones may be connected to a cylindrical duct or pipe of the same diameter as the large ends of the cones. However, designs other than one comprising joined truncated cones may be used to advantage. For example, the gases may enter the pressure drop zone in a duct of rectangular shape and the reduction in the cross sectional area accomplished by tapering inwardly one or more of the sides. The expansion of the gases can similarly be accomplished by passing the gases through an area in which the cross sectional area of the duct is increased by tapering outwardly from the center one or more of the sides of the duct. It is not necessary that the tapering in either the contraction or expansion areas be uniform. For example, the cross sectional area of the throat may be varied by the use of variable baffles, and in such an instance the gases might enter a first section of a certain uniform contraction angle and then enter the contraction section of variable angle of contraction. Most efficient flows and operation of the pressure drop zone can be obtained if the contraction area has a greater taper than the expansion area. For example, the angle of the contraction area may be from about 20° to 70°, such as between 20° and 50°, and the angle of the expansion area may desirably be from about 3° to 40°, and preferably about 5° to 20°. These angles of contraction and expansion are measured from a line parallel to the direction of flow of the gases. In order to obtain the pressure drop across the pressure drop zone, the cross sectional area of the point of maximum restriction in the pressure drop zone will generally be no more than about 25 percent, and preferably no greater than about 15 percent, of the cross sectional area of the conduit bringing the gases into the pressure drop zone, that is before the contraction section. On the exit end of the pressure drop zone the cross sectional area of the line leaving the pressure drop zone will generally be at least about 300 percent, and preferably at least about 500 percent larger than the cross sectional area of the point of maximum restriction.

The aqueous contacting liquid is preferably introduced at about the point of maximum restriction. The aqueous contacting liquid does not have to be added exactly within the area of maximum restriction but may be added upstream from the maximum restriction. However, the efficiency of the scrubbing operation falls off as the point of injection is removed from the area of maximum restriction. The aqueous contacting liquid may be introduced in any manner in which it comes into intimate contact in the form of discrete droplets with the gases passing through the pressure drop zone. The aqueous contacting liquid may be introduced as discrete droplets, such as produced by a spray, or the aqueous contacting liquid may be broken up into discrete droplets by the force of the gases passing through the pressure drop zone. When reference is made in the specification and claims to a contact being made between the gases passing through the pressure drop zone and discrete droplets of aqueous contacting liquid, this refers to discrete droplets formed by any means such as having been formed by nozzles or to droplets having been formed by breaking up the liquid by the force of the gases passing through the pressure drop zone.

The composition of the aqueous contacting liquid fed to the pressure drop zone may be the same as that described above for the quench composition for the effluent gases from the reaction zone. For example, the aqueous contacting liquid may contain from 0 to 60 weight percent halogen in all forms such as elemental halogen, halogen halide or ammonium halide or mixtures thereof. Preferably the aqueous contacting liquid will contain from about 5 to 50 weight percent of halogen compounds of the same halogen being fed to the dehydrogenation zone as catalyst. For example, if iodine is fed to the dehydrogenation zone the aqueous contacting liquid would preferably contain some form of inorganic iodine such as hydrogen iodide or ammonium iodide. It is one of the advantages of this invention that the halogen recovered in the liquid-gas separator may be recycled in the pressure drop zone as aqueous contacting liquid, and that greater efficiencies are obtained when a halogen solution is used as the aqueous contacting liquid rather than only water.

The exit gases from the pressure drop zone will suitably have a temperature of from 50° C. to 500° C., and generally will be at a temperature of about 50° C. to 250° C. The exit gases from the pressure drop zone comprise entrained aqueous droplets which contain dissolved inorganic halogen. These droplets may be separated from the organic gases by conventional means for separating liquids from gases including baffle chambers, centrifugal apparatus, cyclone separators, scrubbing towers and the like. The separated liquid contains the inorganic halogen in aqueous solution. This solution may be used as the quench for the reactor effluent gases, as the aqueous contacting liquid to the pressure drop zone and as the source of halogen to be fed to the dehydrogenation zone. A distinct advantage of the process of this invention for producing unsaturated organic compounds is that the recovered aqueous solution may be fed directly to the dehydrogenation zone without further processing such as to convert any halogen compound such as hydrogen halide or ammonium halide to elemental halogen or by a process to remove the water. The purified hydrocarbon product from the vapor separator may be further purified by any of the methods known in the art for separating these mixtures.

The process was demonstrated on a process for the dehydrogenation of n-butene-2 to butadiene-1,3 using a bromine catalyst. A hydrocarbon composition containing 98.9 mol percent n-butene-2, with the remainder being minor amounts of n-butane, butadiene, isobutylene, propylene, and pentane was fed to a fixed bed reactor containing a cerium oxide catalyst. The feed to the reactor contained oxygen fed as air in an amount of 0.70 mol and of oxygen per mol of butene. The bromine catalyst was fed as ammonium bromide in an amount equivalent to 0.020 mol of $Br_2$ per mol of butene-2. The maximum bed temperature of the reactor was about 670° C. The rate of feed of butene-2 was 0.85 mol per hour which was equivalent to a flow rate of butene of 0.80 LHSV (liquid volumes of butene per volume of reactor packed with catalyst per hour). The reactor feed contained 11 mols of steam per mol of butene. The pressure of the inlet gases was about 6 p.s.i.g. Excluding the water, the effluent from the reactor contained on a mol percent basis, about 74 percent nitrogen, 16 percent butadiene, 0.8 percent carbon monoxide, 3.2 percent carbon dioxide, 3.7 percent unreacted butene, 0.04 mol percent methyl bromide and 0.4 mol percent ammonium bromide. The remainder was composed of oxygen and oxygenated hydrocarbons, saturated hydrocarbons such as n-butane, olefins such as ethylene and isobutylene, and acetylenic hydrocarbons. The effluent also contained the 11 mols of steam per mol of butene fed to the reactor together with steam formed during the reaction. Approximately ½ mol of steam was formed in the reaction per mol of butene fed to the reactor. The effluent gases leaving the dehydrogenation zone were at a temperature of about 670° C. and were at a pressure of about 5 p.s.i.g. The effluent gases were quenched to about 100° C. by spraying the effluent gases with 0.2 gallon per minute of water of a temperature of about 50° C. The gases leaving the first quench zone were then further quenched by spraying 8 gallons per minute of about 99° C. ammonium bromide solution of 32 weight percent ammonium bromide concentration. The gases were then still at a temperature of about 100° C. and were conducted to the pressure drop zone through a cylindrical pipe of 4 inches internal diameter. The pressure drop zone had an overall length of 20 inches and consisted of a contraction section which was a cone shaped conduit which was smoothly tapered down to the throat. The length of the inwardly tapered contraction section was 8 inches. The throat, or section of at least cross sectional area, of the pressure drop zone was cylindrical in shape and had an internal diameter of about 1¼ inches and a length of about 3 inches. As the gases of accelerated velocity passed through the throat section, they were contacted with an aqueous solution of ammonium bromide, containing 32 weight percent ammonium bromide based on the total weight of the solution. The ammonium bromide solution was fed to the throat at a rate of 4 gallons per minute and was fed through 3 nozzles. The temperature of the ammonium bromide solution was about 100° C. The contacted gases were then allowed to expand in an expansion section which was a smoothly tapered cone shaped section which was tapered outwardly from the 1¼ inch diameter throat to a 2½ inch cylindrical outlet pipe leaving the pressure drop zone. The expansion section was 10 inches long. The pressure of the gases was measured immediately before they entered the contraction section and again immediately after they left the expansion section. The pressure drop of the gases across the pressure drop zone was 60 inches of water. The contacted gases were then conducted to a liquid-gas separator. The overhead from the separator contained about 5 mol percent hydrocarbon and 75 mol percent uncondensed steam together with a minor amount of ammonium bromide. The liquid separated as the bottoms from the cyclone separator comprised an aqueous bromide solution of about 32 weight percent ammonium bromide. The amount of ammonium bromide in the cyclone separator overhead was measured and determined to be 1.0 mol percent of the ammonium bromide having been fed to the dehydrogenation zone per unit of time. The aqueous ammonium bromide solution from the bottoms of the cyclone separator was recycled as contacting liquid to the pressure drop zone and was also fed as catalyst to the stream entering the dehydrogenation zone.

The process described above was repeated utilizing ammonium iodide as the halogen and high recoveries of ammonium iodide were obtained. In another run hydrogen bromide was substituted for the ammonium bromide and similarly high recoveries were obtained.

Although the process for the removal of inorganic halogen has been described utilizing an effluent from a process for the dehydrogenation of hydrocarbons with halogen liberating materials, the invention is applicable to other processes wherein a similar gaseous composition is obtained. The process is characteristically adapted for the removal of inorganic halogen from hydrocarbon mixtures which contain olefins or diolefins. When the phrase inorganic halogen is used in the specification and claims, this refers to all forms of inorganic halogen such as elemental halogen, halogen halides and ammonium halides. The process of the invention is also applicable for the removal of inorganic halogen from the reaction product of the cracking of hydrocarbons such as 2-methyl pentene-2 to isoprene using bromine catalysts. Compositions contaminated with inorganic halogen useful for treatment according to this invention may be such as the entire effluent from a reactor, or if the composition leaving the reactor contains steam the composition obtained either before or after condensation of steam from the hydrocarbon phase. The composition to be treated may be split into fractions containing most of the inorganic halogen and this latter fraction treated according to this invention.

Modification of the process of this invention may be employed. For instance, a combination of steps may be utilized in the place of any of the described single steps. It is a preferred feature of this invention that two or more pressure drop zones may be operated in series with the resulting liquid phase from either pressure drop apparatus being used as desired, for example, as the effluent quench solution, as the feed to the dehydrogenation zone or as the contacting liquid for one or more of the other pressure drop zones.

The composition to be treated by quenching and contacting in the pressure drop zone may advantageously comprise from about 25 to 96 mol percent steam, such as from 50 to 95 mol percent steam with the remainder being an organic phase such as hydrocarbons together with halogen in all forms. The invention may advantageously be employed on mixtures containing an organic phase having at least about 50 mol percent unsaturated organic compounds such as monoolefins, diolefins or acetylenes and mixtures thereof, generally at least 50 mol percent of diolefins of from 4 to 6 carbon atoms, together with less than 5 mol percent inorganic halogen such as between 0.001 to 5.0 mol percent inorganic halogen based on the combined weight of unsaturated compounds. Excellent results have been obtained on a mixture comprising aliphatic hydrocarbons of at least about 40 mol percent of 4 to 6 carbon atoms unsaturated aliphatic compounds, such as butadiene, contaminated with less than 0.5 mol percent of inorganic halogen based on the unsaturated compounds. The amount of inorganic halogen will be a minor amount of the composition with the mol percent of inorganic halogen generally being less than 10 mol percent, with the mol percent more often being less than 2 mol percent of the total gaseous composition to be treated. The invention is particularly useful for treating hydrocarbon compositions containing inorganic water soluble bromine or iodine compounds such as hydrogen bromide, hydrogen iodide, ammonium bromide, ammonium iodide and mixtures thereof.

I claim:

1. A process for the purification of a gaseous mixture of unsaturated aliphatic hydrocarbons at a temperature of at least 400° C. contaminated with inorganic halogen which comprises: quenching the gaseous mixture with an aqueous solvent for the inorganic halogen; then passing the gaseous quenched mixture through a pressure drop zone, said pressure drop zone having a restricted cross sectional area; contacting the gaseous quenched mixture passing through the restricted cross sectional area of the pressure drop zone with an aqueous contacting liquid, the pressure drop across the restricted cross sectional area being at least about 15 inches of water; and separating the exit gases from the pressure drop zone into an aqueous liquid phase containing a solution of the inorganic halogen, and a gaseous phase comprising the purified unsaturated aliphatic hydrocarbons.

2. The process of claim 1 wherein the pressure drop across the restricted cross sectional area is at least about 25 inches of water.

3. The process of claim 2 wherein the aqueous solvent contains dissolved halogen.

4. A process for the purification of a gaseous mixture of unsaturated aliphatic hydrocarbons at a temperature of at least 400° C. contaminated with inorganic halogen which comprises: quenching the gaseous mixture with an aqueous solvent for the inorganic halogen; then passing the gaseous quenched mixture through a pressure drop zone, said pressure drop zone having a throat of restricted cross sectional area; contacting the gaseous quenched mixture passing through the restricted cross sectional area of the pressure drop zone with an aqueous solution of inorganic halogen; the pressure drop across the restricted cross sectional area being at least about 40 inches of water; and separating the exit gases from the pressure drop zone into a liquid phase containing an aqueous solution of the inorganic halogen, and a gaseous phase comprising the purified unsaturated aliphatic hydrocarbons.

5. The process of claim 4 wherein the velocity of the gaseous mixture at the throat of the pressure drop zone is from about 100 feet per second to about 800 feet per second.

6. The process of claim 5 wherein the gaseous mixture is contaminated with an ammonium halide from the group consisting of ammonium chloride, bromide, and iodide, the mixture is quenched with an aqueous solvent containing ammonium halide, the gaseous quenched mixture passing through the pressure drop zone is contacted with an aqueous solution of ammonium halide, and an aqueous solution of ammonium halide is separated from the exit gases from the pressure drop zone.

7. The process of claim 5 wherein the gaseous mixture is contaminated with inorganic bromine, the gaseous quenched mixture passing through the pressure drop zone is contacted with an aqueous solution of inorganic bromine, and an aqueous solution of inorganic bromine is separated from the exit gases from the pressure drop zone.

8. A process for the preparation of unsaturated hydrocarbons by dehydrogenation which comprises heating a mixture of a hydrocarbon to be dehydrogenated and a halogen catalyst at a temperature of at least 400° C. in a dehydrogenation zone, to produce an effluent mixture comprising unsaturated hydrocarbon and inorganic halogen; quenching the effluent mixture with an aqueous solvent for the inorganic halogen to produce a gaseous quenched mixture; then passing the gaseous quenched mixture through a pressured drop zone, said pressure drop zone having a throat of restricted cross sectional area; contacting the said gaseous quenched mixture passing through the restricted cross sectional area of the pressure drop zone with an aqueous liquid, the pressure drop across the restricted cross sectional area being at least 15 inches of water; and separating the exit gases from the pressure drop zone into a liquid phase containing an aqueous solution of the inorganic halogen, and a gaseous phase comprising the purified unsaturated hydrocarbon.

9. The process of claim 8 wherein the velocity of the gaseous mixture at the throat of the pressure drop zone is from about 100 feet per second to about 800 feet per second.

10. The process of claim 8 wherein oxygen and steam are employed in the dehydrogenation zone, and the separated liquid phase is fed to the dehydrogenation zone.

11. The process of claim 8 wherein the hydrocarbon is an aliphatic hydrocarbon of 2 to 6 carbon atoms, having at least two adjacent carbon atoms each of which carbon atom has at least one hydrogen atom attached, the halogen catalyst is an ammonium halide from the group consisting of ammonium chloride, bromide, and iodide, the mixture is quenched with an aqueous solvent containing the ammonium halide, the gaseous quenched mixture passing through the pressure drop zone is contacted with an aqueous solution of the ammonium halide, and an aqueous solution of the ammonium halide is separated from the exit gases from the pressure drop zone.

12. A process for the preparation of butadiene-1,3 which comprises heating a gaseous mixture of butane and ammonium bromide to a temperature of at least 400° C. in a dehydrogenation zone to produce a gaseous dehydrogenation zone effluent; quenching the gaseous effluent to a temperature of about 60° C. to 300° C. with an aqueous solution of ammonium bromide to form a gaseous quenched mixture through a pressure drop zone, said pressure drop zone having a throat of restricted cross sectional area, and the velocity of the gaseous quenched mixture at the throat of the pressure drop zone being from about 100 feet per second to about 800 feet per second; contacting the gaseous quenched mixture passing through the restricted cross sectional area of the pressure drop zone with an aqueous solution of ammonium bromide, the pressure drop across the restricted cross sectional area being from about 40 to 100 inches of water; and separating the exit gases from the pressure drop zone into a liquid phase containing an aqueous solution of the ammonium bromide, and a gaseous phase comprising the butadiene-1,3.

References Cited

UNITED STATES PATENTS

| 2,921,101 | 1/1960 | Magovern | 260—680 |
| 3,049,574 | 8/1962 | Johnson | 260—678 X |
| 3,207,805 | 9/1965 | Gay | 260—680 |

PAUL M. COUGHLAN, JR., *Primary Examiner.*

U.S. Cl. X.R.

260—681.5

UNITED STATES PATENT OFFICE
CERTIFICATE OF CORRECTION

Patent No. 3,426,094                                                               February 4, 1969

Olin C. Karkalits, Jr.

It is certified that error appears in the above identified patent and that said Letters Patent are hereby corrected as shown below:

Column 1, line 29, "unsaturaated" should read -- unsaturated --. Column 2, line 42, "materials of halogen materials" should read -- materials or halogen materials --; line 43, "clims" should read -- claims --; line 62, "about 8 to 100 mols" should read -- about 8 and 100 mols --; line 64, "stream" should read -- steam --. Column 3, line 14, "VIB, VIIIB, VIII" should read -- VIB, VIIB, VIII --; line 18, "V-III" should read -- VIII --; line 68, "butane also" should read -- butane; also --. Column 4, line 53, "organic halogen" should read -- inorganic halogen --. Column 5, line 50, "between 100 to 800 feet" should read -- between 100 and 800 feet --. Column 7, line 18, "in the pressure drop zone" should read -- to the pressure drop zone --; line 54, "0.70 mol and of oxygen" should read -- 0.70 mol of oxygen --. Column 10, line 74, "mixture through a pressure" should read -- mixture; passing the gaseous quenched mixture through --.

Signed and sealed this 24th day of March 1970.

(SEAL)
Attest:

EDWARD M. FLETCHER, JR.                                       WILLIAM E. SCHUYLER, JR.
Attesting Officer                                                         Commissioner of Patents